(12) United States Patent
Axelsson et al.

(10) Patent No.: US 10,517,023 B2
(45) Date of Patent: Dec. 24, 2019

(54) METHODS AND ARRANGEMENTS FOR SUPPORTING MOBILITY OF A COMMUNICATION DEVICE IN A WIRELESS COMMUNICATION NETWORK

(71) Applicant: Telefonaktiebolaget LM Ericsson (publ), Stockholm (SE)

(72) Inventors: Håkan Axelsson, Linköping (SE); Mehdi Amirijoo, Linköping (SE); Rasmus Axén, Linköping (SE); Patrik Karlsson, Sollentuna (SE); Walter Müller, Upplands Väsby (SE); Christer Östberg, Staffanstorp (SE); Henrik Ronkainen, Södra Sandby (SE); Thomas Walldeen, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 65 days.

(21) Appl. No.: 15/533,884

(22) PCT Filed: Sep. 29, 2016

(86) PCT No.: PCT/SE2016/050928
§ 371 (c)(1),
(2) Date: Jun. 7, 2017

(87) PCT Pub. No.: WO2018/063043
PCT Pub. Date: Apr. 5, 2018

(65) Prior Publication Data
US 2018/0332508 A1 Nov. 15, 2018

(51) Int. Cl.
*H04W 36/00* (2009.01)
*H04L 5/00* (2006.01)
(Continued)

(52) U.S. Cl.
CPC ...... *H04W 36/0072* (2013.01); *H04B 7/0695* (2013.01); *H04L 5/0023* (2013.01);
(Continued)

(58) Field of Classification Search
CPC ......... H04W 36/0072; H04W 36/0083; H04W 72/048; H04B 7/0695; H04L 5/0023; H04L 5/0051; H04L 5/0094
See application file for complete search history.

(56) References Cited

U.S. PATENT DOCUMENTS

| 2016/0150435 | A1* | 5/2016 | Baek ..................... H04W 16/28 370/252 |
| 2016/0255548 | A1 | 9/2016 | Cedergren et al. |
| 2018/0034531 | A1* | 2/2018 | Sadiq .................. H04B 7/0408 |

FOREIGN PATENT DOCUMENTS

WO 2016095984 A1 6/2016

* cited by examiner

*Primary Examiner* — Khai M Nguyen
(74) *Attorney, Agent, or Firm* — Murphy, Bilak & Homiller, PLLC

(57) ABSTRACT

Support of mobility for a communication device (120) being served in a serving beam (115a) transmitted by a first network node (110) comprised in a wireless communication network (100). The first network node (110) and the communication device (120) obtains (301a, 302; 701, 901) a first information set comprising predetermined identifiers identifying reference signals, respectively. The first network node (110) maintains (310; 904) a third information set that associates one or more candidate beams (115b, 116a-c), other than the serving beam (115a), with one or more predetermined identifiers of the first information set, which one or more predetermined identifiers identify reference signals that are being transmitted in said one or more candidate beams (115, 116a-c).

20 Claims, 10 Drawing Sheets

(51) Int. Cl.
*H04B 7/06* (2006.01)
*H04W 72/04* (2009.01)

(52) U.S. Cl.
CPC .......... *H04L 5/0048* (2013.01); *H04L 5/0051* (2013.01); *H04L 5/0094* (2013.01); *H04W 36/0083* (2013.01); *H04W 72/048* (2013.01)

METHODS AND ARRANGEMENTS FOR SUPPORTING MOBILITY OF A COMMUNICATION DEVICE IN A WIRELESS COMMUNICATION NETWORK

TECHNICAL FIELD

Embodiments herein concern methods and arrangements relating to mobility of a communication device in a wireless communication network, e.g. a telecommunication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) is used for the transmission path from the base station to the wireless device. The expression uplink (UL) is used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. The expected benefit from this design principle is expected to be significantly lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where we also foresee a rapid technology development in the years to come. Hence it is natural to assume that advanced antenna systems in general and massive Multiple Input Multiple Output (MIMO) transmission and reception in particular, will be a cornerstone in a future 5G wireless communication network.

As beam-forming becomes increasingly popular and capable it becomes natural to use it not only for transmission of data but also for transmission of control information. This is one motivation behind the relatively new control channel in LTE known as enhanced Physical Downlink Control CHannel (ePDCCH). When a control channel is beamformed, the cost of transmitting the overhead control information can be reduced due to the increased link budget provided by additional antenna gain. This is a good property that likely will be utilized also for 5G, perhaps to an even larger degree than what is possible in the currently in LTE.

The mobility procedure in LTE utilizes reference symbols that are consistently broadcasted per cell, so called Cell Reference Symbols (CRS). The CRS are used by UEs to measure radio quality on candidate cells in order to provide cell reselection in idle mode and to provide measurement reports to the network in connected mode.

The mobility procedure in 5G is planned to be beam based, where the reference signals defining such a beam is defined via specific Reference Signals (RS), that may be Mobility Reference Symbols (MRS), and can be activated by the node/s when a wireless communication device, such as a UE, is in need of making a handover. Thus the mobility procedure may be enabled via turning on a MRS on a selected set of beams, that may be named MRS beams, for the wireless communication device to measure and report back after which a network node decides on which such MRS beam will become the new serving beam for the wireless communication device in question. Which MRS beams to be transmitted by network nodes may depend on several factors including the current serving beam. Therefore, a network node may maintain a beam-to-beam relation table, that simply may be named a beam relation table, in order to refer which beam needs to be transmitted by the network node(s) to aid mobility of the wireless communication device.

In order for smooth operation of the mobility procedure in 5G, a 5G network node will typically also have a list of neighboring 5G nodes which can be handover candidates for wireless communication devices, i.e. candidate network nodes. Such list, which may be named a neighbor node relation table, can be provided automatically and/or manually, at least to some degree.

From the above discussed differences between LTE and 5G, e.g. with regard to reference signals, it can be realized that the mobility procedure in LTE is not suitable for 5G.

SUMMARY

In view of the above, an object is to provide one or more improvements with regard to mobility of a communication device in a wireless communication network, e.g. to support mobility of the communication device when the wireless communication network is a 5G network, or is based on similar features as planned for 5G networks, such as discussed above.

According to a first aspect of embodiments herein, the object is achieved by a first method, performed by a communication device, for supporting for supporting mobility of the communication device. The communication device being served in a serving beam transmitted by a first network node comprised in a wireless communication network. The communication device obtains a first information set comprising predetermined identifiers identifying reference signals, respectively. The communication device then identifies a reference signal being transmitted in a candidate beam other than the serving beam and provided by a candidate network node. Thereafter the communication device identifies, based on the first information set, a predetermined identifier associated with the identified reference signal. The communication device then sends the identified predetermined identifier to the first network node, and thereby enables the first network node to identify the candidate beam and/or the candidate network node providing the candidate beam.

According to a second aspect of embodiments herein, the object is achieved by a computer program comprising instructions that when executed by a communication device causes the communication device to perform the first method according to the first aspect.

According to a third aspect of embodiments herein, the object is achieved by a carrier comprising the computer program according to the second aspect.

According to a fourth aspect of embodiments herein, the object is achieved by a second method, performed by a first network node comprised in a wireless communication network, for supporting mobility of a communication device being served in a serving beam transmitted by the first network node. The first network node obtains a first information set comprising predetermined identifiers identifying reference signals, respectively. The first network node maintains a third information set that associates one or more candidate beams, other than the serving beam, with one or more predetermined identifiers of the first information set, which one or more predetermined identifiers identify reference signals that are being transmitted in said one or more candidate beams.

According to a fifth aspect of embodiments herein, the object is achieved by a computer program comprising instructions that when executed by a first network node causes the first network node to perform the second method according to the fourth aspect.

According to an sixth aspect of embodiments herein, the object is achieved by a carrier comprising the computer program according to the fifth aspect.

According to a seventh aspect of embodiments herein, the object is achieved by a communication device for supporting mobility of the communication device when the communication device is served in a serving beam transmitted by a first network node comprised in a wireless communication network. The communication device is configured to obtain a first information set comprising predetermined identifiers identifying reference signals, respectively. The communication device is further configured to identify a reference signal being transmitted in a candidate beam other than the serving beam and provided by a candidate network node. Moreover, the communication device is configured to identify, based on the first information set, a predetermined identifier associated with the reference signal. Further, the communication device is configured to send the identified predetermined identifier to the first network node, thereby enabling the first network node to identify the candidate beam and/or the candidate network node providing the candidate beam.

According to an eight aspect of embodiments herein, the object is achieved by a first network node for supporting mobility of a communication device when the communication device is served in a serving beam transmitted by the first network node when the first network node is operative in a wireless communication network. The first network node is configured to obtain a first information set comprising predetermined identifiers identifying reference signals, respectively. Further the first network node is configured to maintain a third information set that associates one or more candidate, beams, other than the serving beam, with one or more predetermined identifiers of the first information set, which one or more predetermined identifiers identify reference signals that are being transmitted in said one or more candidate beams.

Thanks to the first information set and the third information set, and the handling thereof as described above, it is e.g. enabled to:

Perform dynamic allocation of reference symbols to radio beams for mobility purpose, such as allocating a predetermined identifier, typically identifying a combination of a reference symbol and a frequency identifier and/or a time identifier, dynamically when needed and de-allocate when not needed. Such dynamic allocation resulting a smaller range of unique reference symbols needed, which improves performance in the network in many aspects. For example, battery lifetime in communication devices and link performance are improved, and also coverage when the reference symbols are broadcasted.

Use consistent data for beam switch mobility in all involved network nodes, including the communication device, while still allowing for dynamic allocation.

Minimize signaling effort between the communication device and the wireless communication network, and between network nodes, while still allowing for said dynamic allocation, since in principle only a predetermined identifier, e.g. a Mobility Reference Symbol (MRS) index, that can be kept comparatively small in size, is needed to be communicated.

Minimize complexity in communication devices since the communication device does not need to know about radio beam or network candidate network node identities, but is still able to, through the predetermined identifiers, report information about candidate radio beams and candidate radio network nodes in a consistent way.

As indicated elsewhere herein, the second information set enable further improvements regarding at least the last two points.

Hence, embodiment herein provide improvements with regard to mobility of a communication device in a wireless communication network based on features as planned for 5G networks as discussed above.

BRIEF DESCRIPTION OF THE DRAWINGS

Examples of embodiments herein are described in more detail with reference to the appended schematic drawings, which are briefly described in the following.

DETAILED DESCRIPTION

Figure 1:
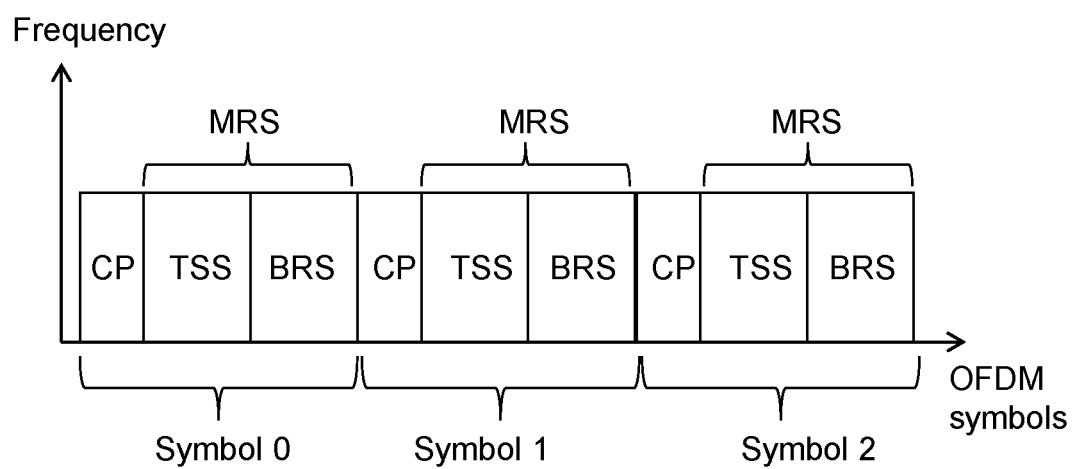
FIG. 1 is a diagram schematically showing how Mobility Reference Symbols that may be used in embodiments herein can be formed.

Throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

In the following, embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of a development towards embodiments herein, the situation and problems indicated in the Background will first be further discussed.

In case of a lean realization of a 5G network, such as discussed above in the

Background, there will be no reference symbols consistently broadcasted from the network. Therefore, to support mobility, reference symbols in neighbor areas may be activated when needed, that is, when a UE is in need of mobility actions. These reference symbols, that thus may be activated "on demand", are typically referred to as Mobility Reference Symbols (MRSs), as already mentioned in the Background. It is further expected to be a limited number of MRSs made orthogonal by coding of signature sequences, such as Time and Frequency Synchronization Signals (TSS) and one Beam Reference Signals (BRS), and/or separated in time by being transmitted by different OFDM symbols. TSS is used to synchronize time, corresponding to OFDM symbol timing, and coarse frequency offset estimation in a beam. BRS is used for measurements on mobility beam candidates and also for frame and sub-frame timing. A MRS typically comprises a combination of one TSS and one BRS. The MRSs may be identified by MRS identifiers (MRS Id).

FIG. 1 illustrates a situation with different such MRS's, corresponding to different OFDM symbols.

To make sure there is no mismatch in different nodes it would be desirable with a uniform way for a UE and RAN nodes to address a specific MRS identified by signature sequence, frequency and time. In addition, it would be desirable if a RAN node, based on a reported MRS from a UE, would be able to identify a specific, unique beam and identify in what neighboring node this beam is handled. A solution to this would support mobility for a UE moving in a radio network between coverage areas handled by different beams. A UE should not need to be aware of the node or beam from which a MRS is transmitted.

A problem with allocation of MRSs is that large signals and with high intensity typically are needed between a UE and the RAN, and between RAN nodes, in order to specify a specific MRS in both signature sequence frequency and time. This reduces spectral efficiency due to large overhead on radio interface, and may have a negative impact on Transport Network (TN) and RAN capacity.

In short, problems that have been identified and are desirable to solve e.g. include:
a) how to establish a way for UEs and the RAN to address a specific MRS identified by signature sequence, frequency and time, in a uniform way so that there is no mismatch or ambiguity in different nodes,
b) how a RAN node shall be able to find a specific beam, handled by a specific node, based on measurement report from a UE with no knowledge of the beam and node,
c) how to minimize signaling overhead when dynamically allocating a MRS to a specific beam, and performing signaling between UEs and the RAN, and between RAN nodes.

Figure 2:
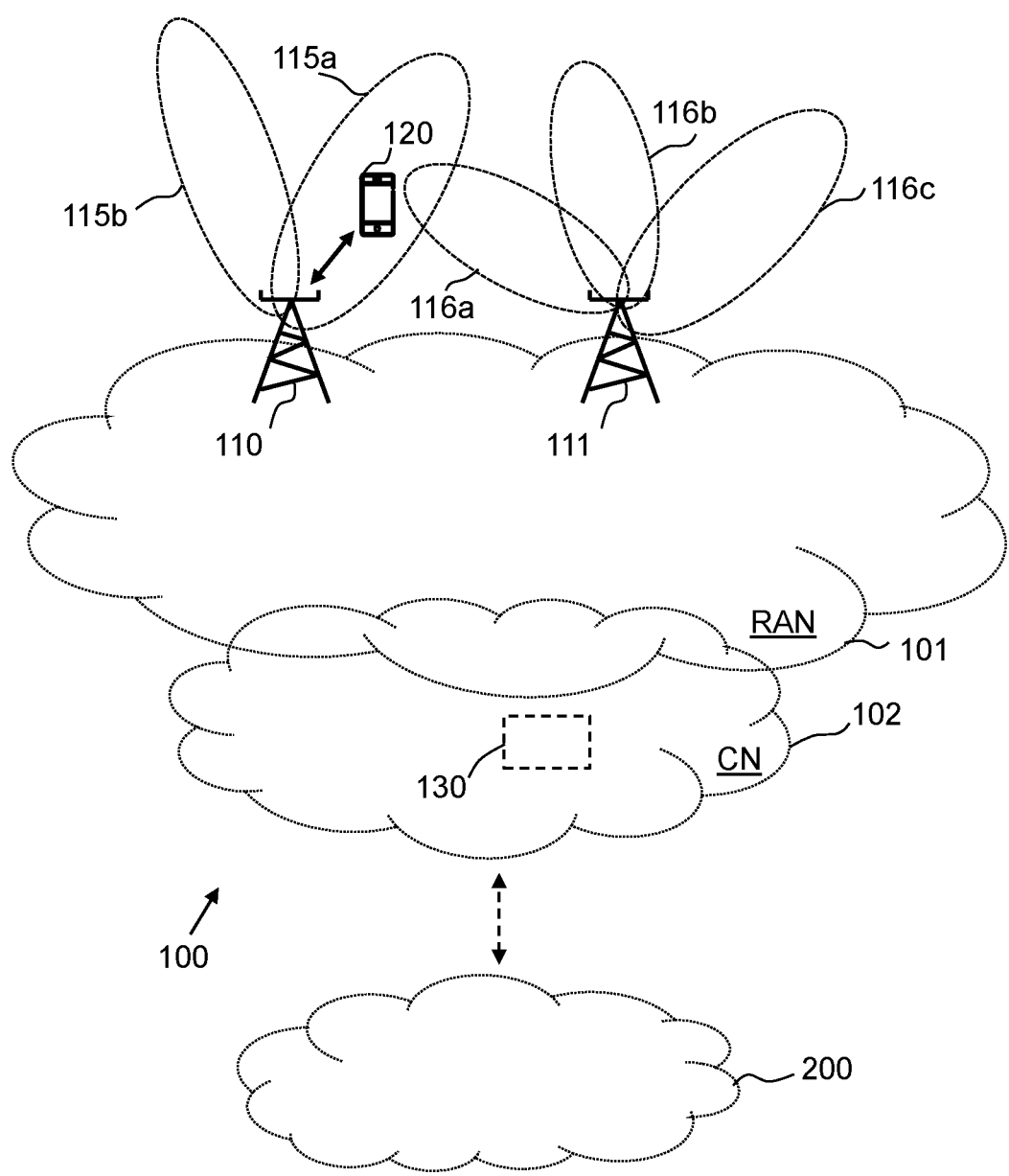
FIG. 2 is a block diagram schematically depicting an example of a wireless communication network relevant for embodiments herein.

FIG. 2 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports at least one Radio Access Technology (RAT), e.g. New Radio (NR) that also may be referred to as 5G, and that may be based on a so called "lean design", where "always on" signaling is not used or present, or at least desirable to keep to a minimum. By "always on" signaling is typically meant downlink radio signals that are broadcasted continuously or at least very frequently and independently on if there is any communication device present or not for receiving the downlink signals. The "always on" downlink signaling typically comprises downlink reference signals identifying nodes and/or cells transmitting them so that a communication device thereby can identify, measure on and possibly connect to these nodes and/or cells.

The wireless communication network 100 comprises network nodes that are communicatively interconnected. The network nodes may be logical and/or physical and are located in one or more physical devices. The wireless communication network 100 comprises a first network node 110, and a second network node 111, typically radio network nodes, i.e. network nodes being or comprising a radio transmitting network nodes, such as base stations, and/or that are being or comprising controlling nodes that control one or more radio transmitting network nodes.

The wireless communication network 100, or specifically one or more network nodes thereof, e.g. the first network node 110 and the second network node 110, is typically configured to serve and/or control and/or manage one or more communication devices, such as a communication device 120, in radio coverage areas, i.e. an area where radio coverage is provided for communication with one or more communication devices. Each radio coverage may be provided by and/or associated with a particular Radio Access Technology (RAT). The radio coverage may be radio coverage of a radio beam, that simply may be named a beam. With regard to embodiments herein, the beams may be mobility beams, that may be of more static nature than other beams that may be subject to more beamforming and may not be involved in mobility actions to the same extent. The set or group may be beams that are transmitting identical beam identifiers, e.g. all beams provided by a one or more network nodes that transmit the same identifier, or in other words that have a common identifier.

As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving this one or few communication devices. The beam may be changed dynamically by beamforming to provide desirable coverage for the one or more communication devices being served by the beam. A beam has a transmission direction and a width. Further, a beam may carry one or more MRSs. There may be more than one beam provided by one and the same network node.

Beams in the following and in embodiments herein, may be such beams as described above.

In the shown example of FIG. 2 there is a beam 115a and a beam 115b provided by the first network node 110 and there is a beam 116a, a beam 116b and a beam 116c, provided by the second network node 111.

As shown in the figure and in an exemplifying scenario: The communication device 120 is located in and is served in the beam 115a by the first network node 110. The first network node 110 is thus an example of a serving, or source, network node for the communication device 120. Similarly is the beam 115a is an example of a serving beam for the communication device 120. It is further seen that the beams, 115b, 116a-c are neighbouring beams to the beam 115a and are examples of candidate beams for a mobility action, such as a handover of the communication device 120. The second network node 110 is thus an example of a candidate, or target, network node for the communication device 120. Since the beam 115b is an example of a candidate beam, the first network node 110 may be considered a candidate network node at the same time as it is a serving network node.

Further, the wireless communication network 100 may comprise one or more central nodes, e.g. a central node 130, i.e. one or more network nodes that are common or central and communicatively connected to multiple other nodes, e.g. multiple radio network nodes, and may be for managing and/or controlling these nodes. The central node 130 may e.g. be a so called Operations, Administration and Management and/or Maintenance (OAM) node. The one or more central nodes may be comprised in the CN 102, and may thus be or comprise one or more core network nodes, and/or may e.g. be one or more internal management nodes of the wireless communication network 100.

The wireless communication network, e.g. the CN 102, may further be communicatively connected to, and thereby e.g. provide access for said communication devices, to an external network 200, e.g. the Internet. The communication device 120 may thus communicate via the wireless communication network 100, with the external network 200, or rather with one or more other devices, e.g. servers and/or other communication devices connected to other wireless communication networks, and that are connected with access to the external network 200.

Figure 3:
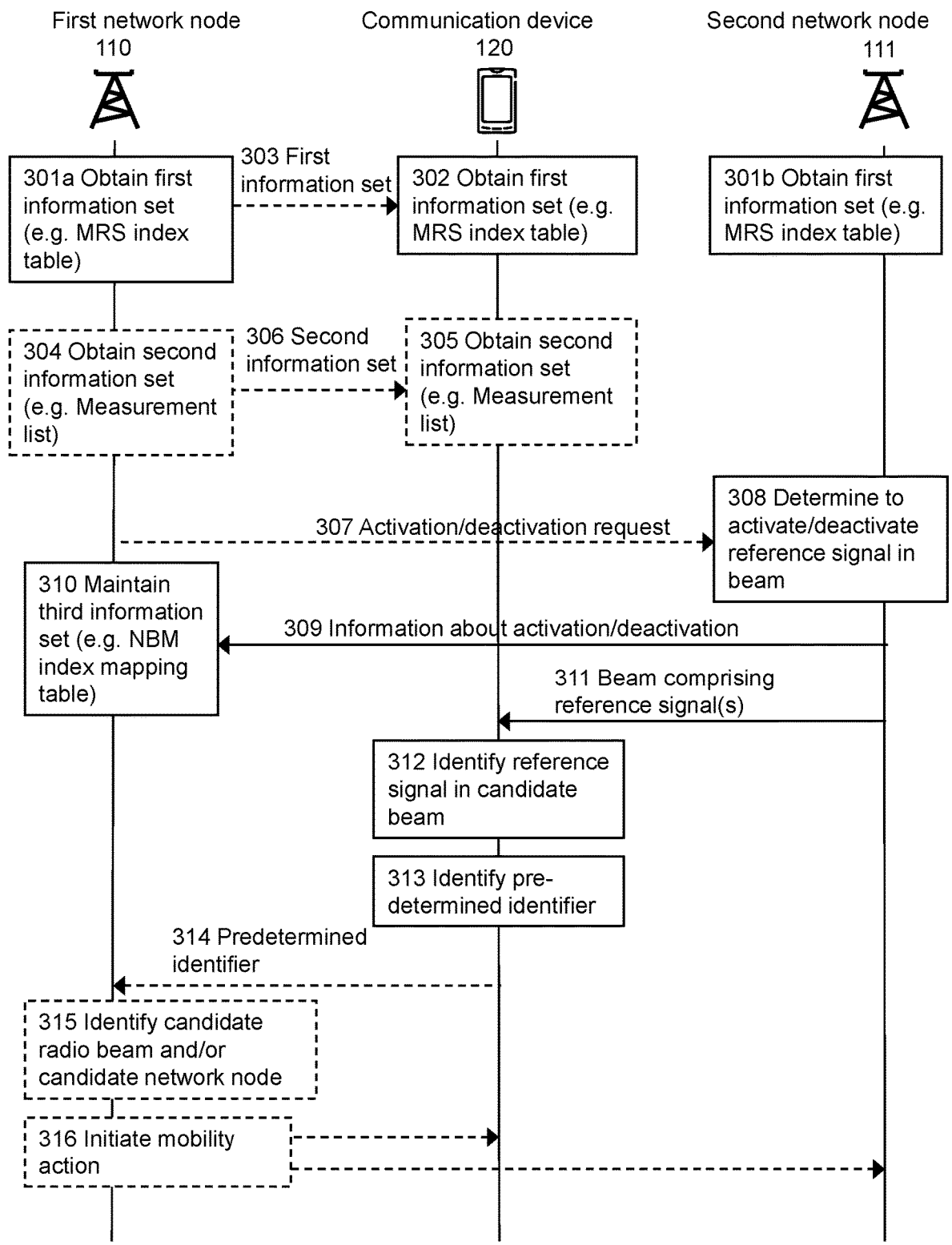
FIG. 3 is a first combined signaling diagram and flowchart for describing embodiments herein.

FIG. 3 depicts a combined signaling diagram and flowchart, which will be used to discuss embodiments herein.

The actions below are for supporting mobility of the communication device 120. In the shown example the first network node 110 is a serving, or source, network node for the communication device 120, and the second network node 111 is a candidate, or target, network node for a mobility action, e.g. handover, of the communication device 120.

The candidate network nodes mentioned herein, e.g. the second network node 111, and the first network node 110, may be so called access nodes that provides access for communication devices to the wireless communication network 100, and are thus typically radio network nodes, such as radio base stations and/or control nodes of radio base stations.

The actions below may be taken in any suitable order and/or be carried out fully or partly overlapping in time when this is possible and suitable.

Actions 301a-b

The first network node 110 obtains a predetermined first information set, e.g. a MRS index table as exemplified herein, comprising predetermined identifiers identifying reference signals, respectively. The predetermined first information set may be obtained also by the second network node 111. The predetermined first information set may be obtained by all network nodes providing beams in the wireless communication network 100 and is typically the same for all nodes in the wireless communication network 100. The predetermined first information set may be static for the wireless communication network 100. The first information set may be fully or partly determined by a standardization specification and/or may be determined or set, and/or obtained, at some occasion for configuration or reconfiguration of the wireless communication network 100, e.g. at deployment thereof.

The predetermined identifiers in the first information set may identify frequency and/or time associated with transmission of the reference signals, and/or characteristics of the reference signals, whereby the reference signals can be found when transmitted and be identified by the predetermined identifiers. The reference signals may correspond to reference symbols and/or the characteristics of the reference signals may be reference symbols and/or one or more signature sequences. For example, the predetermined identifiers may identify different combinations of reference symbol, signature sequence(s), frequency identifier and/or a time identifier, said frequency identifier and time identifier identifying a frequency and a time, respectively, where the reference symbol will be transmitted. The reference symbol may be an OFDM symbol. OFDM symbols associated with the same frequency and time identifiers should preferably be orthogonal.

The predetermined identifiers may be in the form of indexes that, in the predetermined first information set, map to data that enables communication devices, such as the communication device 120, to find and identify the reference signals. For example, the data may correspond to said frequency and/or time associated with transmission of the reference signals, and/or characteristics of the reference signals. The mapping may be accomplished by means of a table, such as a MRS index table as exemplified herein.

Action 302

The communication device may also obtain the predetermined first information set, or corresponding information, e.g. by obtaining it internally or receiving it from a network node, e.g. the first network node 110 or from another network node. The communication device may e.g. receive the first information set the first time the communication device connects to the wireless communication network 100, and or the first time it connects after there has been a configuration or reconfiguration of the network involving a change of first information set.

Action 303

As already indicated under action 302, the first network node 110 may send the obtained first information set to the communication device 120 that thus may receive it.

Action 304

The first network node 110 may obtain a second information set, e.g. a Measurement list as exemplified herein, identifying reference signals to be searched for by communication devices, e.g. the communication device 120.

The first network node 110 may obtain second information set, at least partly internally, e.g. by compiling it, such as by forming and/or assembling it. The second information set may be predefined and e.g. fully or partly defined by standardization.

The second information set may identify the reference signals by means of a subset of predetermined identifiers of the first information set, e.g. by means of a subset of MRS indexes in the MRS index table.

The second information set may be a list of such predetermined identifiers, e.g. MRS indexes. Each predetermined identifier in the second information set may, e.g. through associations in the first information set, uniquely identify a mobility reference symbol and a unique combination of signature sequence, frequency and time. The second information set may also comprise a reporting criteria, e.g. per predetermined identifier, e.g. MRS Index, relating to if/when a found reference signal shall be reported or not.

The second information set is further discussed below under Action 305.

Action 305

The communication device 120 may also obtain the second information set, such as the Measurement list, discussed above under Action 304. The communication device 120 may obtain it internally or receiving it from a network node, e.g. the first network node 110 or from another network node.

The second information set may be predefined and e.g. fully or partly defined by standardization, and/or be received through dedicated signaling.

For example, the communication device 120 may receive the second information set from a network node, e.g. the first network node 110 or another network node. Such network node, e.g. the first network node 110, may have obtained it, e.g. by forming or assembling it, and then sent the second information set to the communication device 120 before any mobility action may be required. It may be advantageous to send it so that the communication device 120 can receive it already at connection setup, e.g. at connection setup with the first network node 120. This in order to minimize signaling at the time of a mobility action, since radio conditions are then typically poorer.

The second information set may be thus be obtained when the communication device 120 connects to the first network node 110, e.g. when the first network node 110 starts to serve the communication device 120. Alternatively or additionally, the first network node 110 may send the second information set for receipt by the communication device 120 at some other point in time, e.g. when/if there is a change in the second information set. If the second information have been received by the communication device 120 previously, e.g. from the first network node 110 or from another network node, the first network node 110 need not send it at again and/or the communication device 120 need not to receive it again.

As already indicated above, the second information set enables communication devices to only search for a subset of a larger set of possible reference signals, e.g. a subset of reference signals identified in the first information set.

Thanks to this, reference signals can be search for faster and with lower energy consumption than else would be the case.

The second information set, i.e. corresponding to reference signals that communication devices, including the communication device 120, should search for, should be the same in a certain area that e.g. may correspond to a city or part of a city. Network nodes, including e.g. the first network node 110 and the second network node 111, in said certain area, and/or any network node that provides beam(s) for covering some part of said certain area, may use and/or send the same second information set to communication devices in said certain area. Further, any reference signals such network node activates should thus be according to the obtained second information set. The predefined identifiers of the third information set may thus be a subset of the predefined identifiers of the second information set. If there is need to extend the number of reference signals being identified by the second information set, e.g. by extending a number of predefined identifiers of the second information set, an updated, in this case extended, second information set may be obtained and then e.g. be sent to communication devices, e.g. the communication device 120. However, this need not be done for all communication devices that have received the second information set previously, but only to some communication devices, e.g. communication devices that are new in said certain area. Of course, only communication devices that have received the updated second information list may be able to find a reference signal that is only in the updated second information set. However, this can be fully acceptable in many situations and even be beneficial since e.g. the reason for extending the second information set may be to handle further communication devices.

Action 306

As already indicated under Action 305 above, the first network node 110 may send the obtained second information set to the communication device 120 that thus may receive it.

Action 307 The first network node 110 may send an activation and/or deactivation request to the second network node 111 that thus may receive such request. The request may be sent in response to a decision by the first network node that the communication device 120 is in a situation where a mobility action may be needed or beneficial. The request requests the second network node to activate and/or deactivate one or more reference signals in one or more beams transmitted by the second network node 111. The second network node 111 may have been selected from a list of neighboring network nodes, e.g. from a neighboring node relation list or similar, and/or the beam(s) may be selected based on beam relations. Neighbor node relations and/or beam relations are typically known in advance, before any mobility action that may trigger the present action.

Action 308

The second network node 111 may determine to activate and/or deactivate one or more reference signals in one or more beams that the second network node 111 transmits. Or, in other words, to transmit and/or stop to transmit one or more reference signals in one or more beams transmitted by the second network node 111.

The reference signals are such that are identified in the first information set and preferably also in the second information set. The activation and/or deactivation may be in response to the request received in Action 307 or it may be in response to some other event, e.g. an internal decision by the second network node 111.

For example, in the present action, the second network node 111 may determine to activate a reference signal, e.g. a reference symbol, in the beam 116a. As exemplified separately below in connection with FIG. 6, the second network node 111 may determine to activate a reference symbol with MRS identifier (Id) 1 etc. according to the first information set, e.g. a MRS index table, and/or according to the second information set, e.g. a Measurement list.

Action 309

The second network node 111 may then send information about the activation and/or deactivation in Action 308 to the first network node 110, e.g. about that said one or more reference signals are now, or will be, activated and/or deactivated in said one or more beams transmitted by the second network node 111. The information may comprise predetermined identifiers from the first information set identifying the activated and/or deactivated reference signals, and identification of said one or more beams of the second network node 111. That is, for each activated or deactivated reference signal, the information about the activation/deactivation should also identify the beam subject for the activation or deactivation.

For example, when a reference signal, e.g. a reference symbol such as MRS, is activated, the information sent in the present action may comprise a predetermined identifier, e.g. MRS index, and an identity of the beam, e.g. a beam identifier that may be globally unique or unique at least in the wireless communication network 100, and/or that may comprise, or consist of, a combination of network node identifier and beam identifier.

Action 310

The first network node 110 maintains a dynamic third information set, e.g. a Node-Beam-to-MRS index mapping table as exemplified herein, that associates one or more other, candidate, beams, e.g. the beams 115b and/or the beams 116a-c, with one or more predetermined identifiers of the first information set, which one or more predetermined identifiers identify reference signals that are being transmitted in said one or more candidate beams. The third information set is typically maintained specifically and/or is specific per network node, e.g. the first network node 110. That is, different network nodes that are, or can be, serving network nodes, may maintain their own separate third information set and that typically differs from such of other network nodes. The third information set may even be maintained per source beam, i.e. on a beam level, and there may thus, for a single network node, be maintained multiple third information sets, one per beam that may serve communication devices.

The candidate beams are typically transmitted by one or more candidate network nodes other than the first network node 110, e.g. the second network node 111, although there may be candidate radio beam(s) transmitted by the first network node 110 as well.

The associations of the third information set may associate a predetermined identifier with a beam identifier identifying a candidate beam, e.g. the beam 116a, and with a network node identifier identifying a candidate network node, e.g. the second network node 111, providing the candidate beam. The third information set, e.g. Node-Beam-to-MRS index mapping table, may be based on a unique beam identifier, e.g. at least unique in the wireless communication network, that is associated with a predetermined identifier, e.g. MRS Index. The beam identifier may be globally unique or unique at least in the wireless communication network 100, or may comprise, or consist of, a combination of network node identifier, identifying the network node transmitting the beam, and a beam identifier identifying the beam at least within the network node transmitting the beam.

The maintenance of the third information set may comprise updating the third information set based on information from one or more candidate radio nodes, e.g. the second network node 111 and/or the first network node 110, regarding activation and/or deactivation of reference signals in one or more candidate radio beams, e.g. one or more of the beams 115b, 116a-c, transmitted by said one or more candidate radio nodes. For example, the updating may be based on the information about activation and/or deactivation that the first network node 110 received in Action 309.

For example, when a MRS is activated in a candidate beam, e.g. beam 116a, the serving first network node 110, i.e. source node, may update the second information set e.g. being the Node-Beam-to-MRS index mapping table, for the source beam, and add that the specific candidate mobility beam currently has an activated MRS by using its MRS index. The table may be built up with a globally, or at least in the wireless communication network 100, unique beam identifier and the MRS Index. The beam identifier may comprise or consist of an identifier for the network node providing the beam, which may be named Node Id, and a beam identifier within this network node, which may be named Beam Id. Signaling between the network nodes may then be made based on the beam identifier and the MRS index.

Action 311

The second network node 111 may transmit, e.g. broadcast, a beam, e.g. the beam 116a, with an activated reference signal, i.e. comprising the reference signal. The communication device 120 may receive this beam and thereby the reference signal.

This action is typically in response to a determination in Action 308 of activating the reference signal. For example, the second network node 111 may transmit the beam 116a with an activated reference symbol with MRS Id 1 etc. according to the first information set that may be a MRS index table. This is exemplified in further detail below in connection with FIG. 6.

Action 312

The communication device 120 identifies a reference signal being transmitted in a candidate radio beam provided by a candidate base station, e.g. the reference signal being transmitted in Action 311 by the second network node 111 in beam 116a. For example, the communication device 120 may identify the reference symbol with MRS Id 1 in beam 116a as exemplified below in connection with FIG. 6.

The reference signal may further be identified based on the obtained second information set, i.e. as obtained in Action 305, e.g. the measurement list. For example, the communication device 120 may search specifically, e.g. only, for such reference signals that are identified by the second information set and may identify the reference signal during such search.

The communication device 120 may e.g. perform measurements according to the Measurement list, and in this process find and identify the reference signal, and possibly also one or more additional reference signals. The reference signal may be identified and/or reported based on that the beam and/or reference signal during the measurements fulfill one or more reporting criteria that may be specified in the second information set, e.g. the Measurement list, as already indicated above. The reporting criteria may specify, e.g. by means of "do not care" value(s) and/or default value(s) and/or range(s), certain reference signals, e.g. by MRS Id, frequency and/or time. In that case the communication device shall e.g. search for and/or report, see Actions 313-314 below, reference signals and associated predetermined identifiers that fulfill the reporting criteria. Hence, there may be a blind detection performed based on the criteria, e.g. that the communication device 120 searches for and/or reports all reference signals that fulfils the reporting criteria. For example, if in the second information set, e.g. Measurement list, a MRS Id is set to "do not care", frequency is set to "1" and time to "1", then the communication device should search for and/or report all MRS Id found on frequency "1" and time "1".

The communication device 120 may thus, during measurements according to the Measurement list, find and identify one or several reference signals, such as MRS(s), that may fulfill one or more reporting criteria. As explained above, each MRS may have a given signature sequence, be located on a specific frequency and at a given point in time. When the communication device identifies such reference signal, the communication device 120 may find and identify the predetermined identifier for this reference signal using the first information set, e.g. MRS index table, which is discussed further in the next action.

Action 313

The communication device 120 identifies, based on the first information set, e.g. the MRS index table, a predetermined identifier associated with the reference signal identified in Action 312. The communication device 120 may here thus e.g. identify the reference symbol with MRS Id 1 etc. and then, from the first information set, e.g. MRS index table, find that this reference symbol is being identified by a certain predetermined identifier, e.g. find that MRS Id 1 etc. is identified by a MRS index 1. Note that it is coincidental that the MRS Id 1 and MRS index 1 in this example both concern the value 1.

Action 314

The communication device sends, i.e. reports, the identified predetermined identifier in Action 313, e.g. MRS index 1, to the first network node 110. The first network node may thereby receive a predetermined identifier associated with a reference signal that the communication device 120 has identified in a candidate radio beam, e.g. the beam 116a.

Note that there may be a reporting criteria, as mentioned above, that may specify if reporting shall be made or not for certain reface signals. However, this criteria may be applied such that the communication device 120 only searches, see Action 312, for and thereby will only identify reference signals that fulfill the reporting criteria. In that case there will then thus only be identified and reported predetermined identifiers, in Actions 313-312, that fulfil the reporting criteria.

Action 315

The first network node 110 may, based on the maintained third information set, see Action 310, and the received predetermined identifier in Action 314, identify the candidate beam, e.g. beam 116a, that comprised the reference signal, and the candidate network node, e.g. the second network node 111, providing the beam. For example, the first network node may check in the third information set, e.g. the Node-Beam-to-MRS index table, which beam is being associated with the received predetermined identifier, e.g. MRS index 1, and may thus find out that this is beam 116a transmitted by the second network node 111.

Hence, only from a single predetermined identifier, e.g. MRS index, received in the uplink by the first network node 110 from the communication device 120 that the first network node 120 serves, the first network node 110 becomes able to identify the second network node 111 as a candidate base station for a mobility action. At the same time it is not needed that the second network node 111 sends the predetermined identifier, e.g. MRS index, in a downlink for receipt by the communication device 120. Instead other more robust and suitable reference signals, e.g. reference symbols identified by MRS Ids etc., can be used as reference signals, which also may be reference signals that are inherit to the RAT being used.

Action 316

The first network node 110 may then initiate, based on the identified candidate beam, e.g. beam 116a, and the identified candidate network node, e.g. the second network node 111, a mobility action. The mobility action, e.g. handover, may be for transferring the communication device 120 from being served in the serving beam, e.g. beam 115a, by the serving first network node 110 to instead being served in the candidate beam, e.g. beam 116a, by the candidate network node 111.

With actions as above and according to embodiments herein, the signaling effort between communication devices, such as the communication device 120, and a RAN, e.g. the RAN 101, such as the first network node 110 thereof, and between RAN nodes, e.g. between the first network node 110 and the second network node 111, can be reduced, or even be minimized, while it still can be ensured consistent data in all involved nodes, including the communication device 120. The signaling is to a large extent based on the predetermined identifiers, e.g. MRS index, and communication devices need not have to know about identities of beams nor identities of nodes providing the beams. Also, much of the signaling relating to a mobility action does not need to have to include any beam and node identities.

Embodiments herein may be described as enabling a synchronized way, with reduced or low signaling efforts, for identifying a candidate beam and candidate network node providing the beam, in order to support mobility. Mobility requires signaling between a communication device and a wireless communication network, a RAN thereof in particular, and between network nodes thereof, and it is desirable with as low signaling effort as possible, in particular in case of 5G for reasons discussed in the foregoing. Embodiment herein are beneficial for mobility actions in a beam based system, e.g. 5G network, that is based on dynamic allocation, e.g. on-demand, of reference symbols to beams used for mobility.

Embodiments herein may be described as involving dynamic mapping of a predetermined identifier, that e.g. may be a "light weight" MRS index, to a certain beam, e.g. identified by a beam identifier. Embodiments herein makes it possible to reduce risks for mismatches between nodes, i.e. information can be kept consistent, but without any need to signal any large amount of data and parameters at each mobility triggered event, i.e. signaling efforts are reduced. Signaling will to a great extent be based on predetermined identifiers, e.g. MRS index, such as between communication devices and a wireless communication network, and between network nodes of the wireless communication network.

Embodiments herein mainly relate to three information sets as discussed above, e.g. in the form of tables and/or data structures, carrying static and dynamic data being used by the communication devices and network nodes when performing mobility actions between beams, i.e. beam switch mobility.

Figure 4:
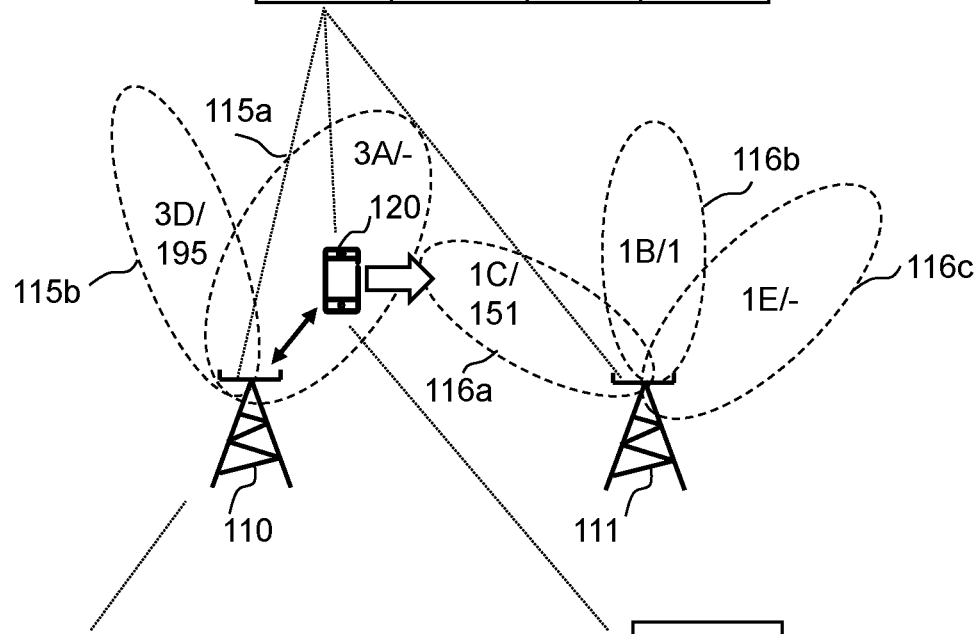
FIG. 4 schematically illustrates an exemplifying scenario based on the wireless communication network of FIG. 1 and embodiments herein.

FIG. 4 schematically illustrates an exemplifying scenario based on the wireless communication network 100 of FIG. 1 and embodiments discussed above. In the shown scenario, the first network node 110 has a node id 3 and the beam 115a has a beam id A and the beam 115b a beam id D. The beam id D may be unique only for the first network node 115a, i.e. for node id 3. Hence, the beam 115a may be uniquely identified in the wireless communication network 100 by the combined node id and beam id, i.e. by 3A. Similarly the beam 115b is identified by 3D. Further, in the shown scenario, the second network node 111 has a node id 1 and the beam 116a has a beam id C, the beam 116b, a beam id B, and the beam 116c, a beam id E. Beams 116a-c may thus be uniquely identified in the wireless communication network 100 by 1C, 1B and 1E, respectively.

FIG. 4 also shows examples of the first, second and third information sets discussed above, and indicates by lines where these information sets are located and/or accessible. The first information set is here in the form of a exemplifying MRS index table, the second information set is here in the form of an exemplifying Measurement list and the third information set is in the form of an exemplifying Node-Beam-to-MRS index mapping table.

In the shown scenario, there are activated reference signals, here reference symbol in the form of MRSs, in some beams and the shown information sets contain exemplary information to reflect this. Beam 115a, i.e. identified by 3A, does not have any activated MRS and not beam 116c, i.e. identified by 1E. The beam 115b, identified by 3D, has an activated reference signal that identified by a MRS index 195 according to the Node-Beam-to-MRS index mapping table. The beam 116a, identified by 1C, has an activated reference signal that identified by a MRS index 151 according to the Node-Beam-to-MRS index mapping table. The beam 116b, identified by 1B, has an activated reference signal that identified by a MRS index 1 according to the Node-Beam-to-MRS index mapping table.

The first information set, here the MRS index table, identifies reference signals in the form of MRSs, preferably orthogonal, and unique in signature sequence, frequency and time. Each such combination is identified with an MRS Index. The first information set may be static and be known to each network node providing mobility beams and to communication devices, e.g. at initial configuration and/or reconfiguration of the wireless communication network 100, and/or e.g. downloaded to communication devices when first connecting to the wireless communication network 100. The first information set may be fully or partly determined through standardization of the MRS index and its attributes. An option is also to download the table from one or more locations to network nodes and/or communication devices at some point in time as long it is prior to the need of performing mobility involving these network nodes and communication devices.

The first network node 110 maintains a third information set, here the Node-Beam-to-MRS index mapping table that reflects the above and that e.g. have been updated when said reference signals were activated. The shown third information set, i.e. Node-Beam-to-MRS index mapping table, may be maintained and to be used specifically for the first network node 110 and/or the beam 115a. For example so that it only contains information about beam from neighbouring nodes and that can be relevant for mobility, such as mobility beams of neighbouring nodes. This information may be provided by neighbouring node relations and/or beam relations, as mentioned in the Background, and which is information that may be accessible by the first network node 110 and be used when maintaining the third information set.

It may be noted that there is information about beam 116c in the table, but without association any MRS index to it, since there is no MRS activated in this beam. Another option is of course to completely remove information about beams in the table if there is no activated MRS in these beams. This is the case for beam 115a, identified by 3A, which also do not have any activated MRS and is not listed in the table. However, even if the beam 115a would have an activated MRS, this information could still be left out if the if the third information set is specific for the beam 115a and if the table is only used for mobility of communication devices already being served in the beam 115a and for finding candidate beams. Mobility to the same beam that a communication device is already being served in, is not relevant, i.e. a serving beam cannot at the same time be candidate beam for one and the same communication device.

According to the second information set, here the Measurement list, the communication device 120 will here thus search for MRSs that are identified by MRS index 1, 2, 5, 151.

Figure 5:
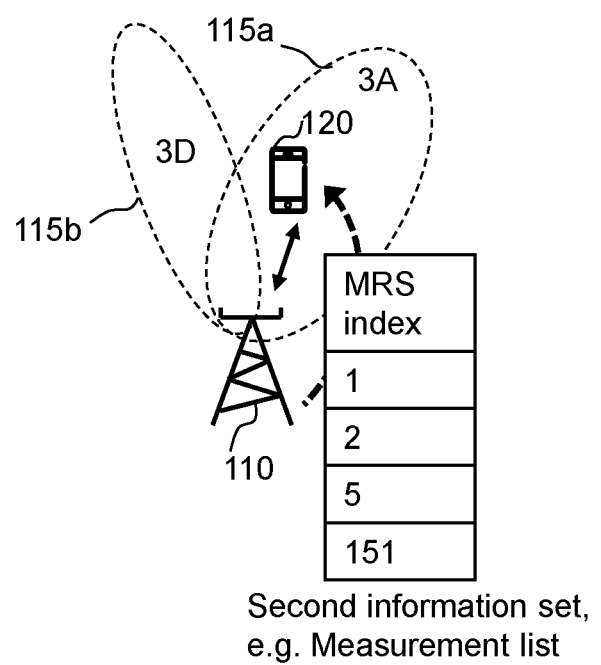
FIG. 5 schematically illustrates a situation for handling of a second information set.

FIG. 5 schematically illustrates a situation when the second information set in the form of a Measurement list as in FIG. 4, is sent to, and received by, the communication device 120 from the first network node 110. However, as already indicated above, it should be noted that the Measurement list instead, or also, can be sent to the communication device 120 by another network node at some point in time before the communication device 120 is served by the first network node 110. However, even if the second information set may have been sent to the communication device 120 before and may not have changed, it may still be beneficial to send it to the communication device 120 when the communication device connects to and begins to be served by the first network node 110 and/or the beam 115a.

As already discussed in the foregoing, the second information set, here a Measurement list, specifies for the communication device 120, by means of predetermined identifiers, here MRS index, which reference signals, here MRSs, that the communication device 120 shall search for and attempt to identify, typically by performing measurements.

Figure 6:
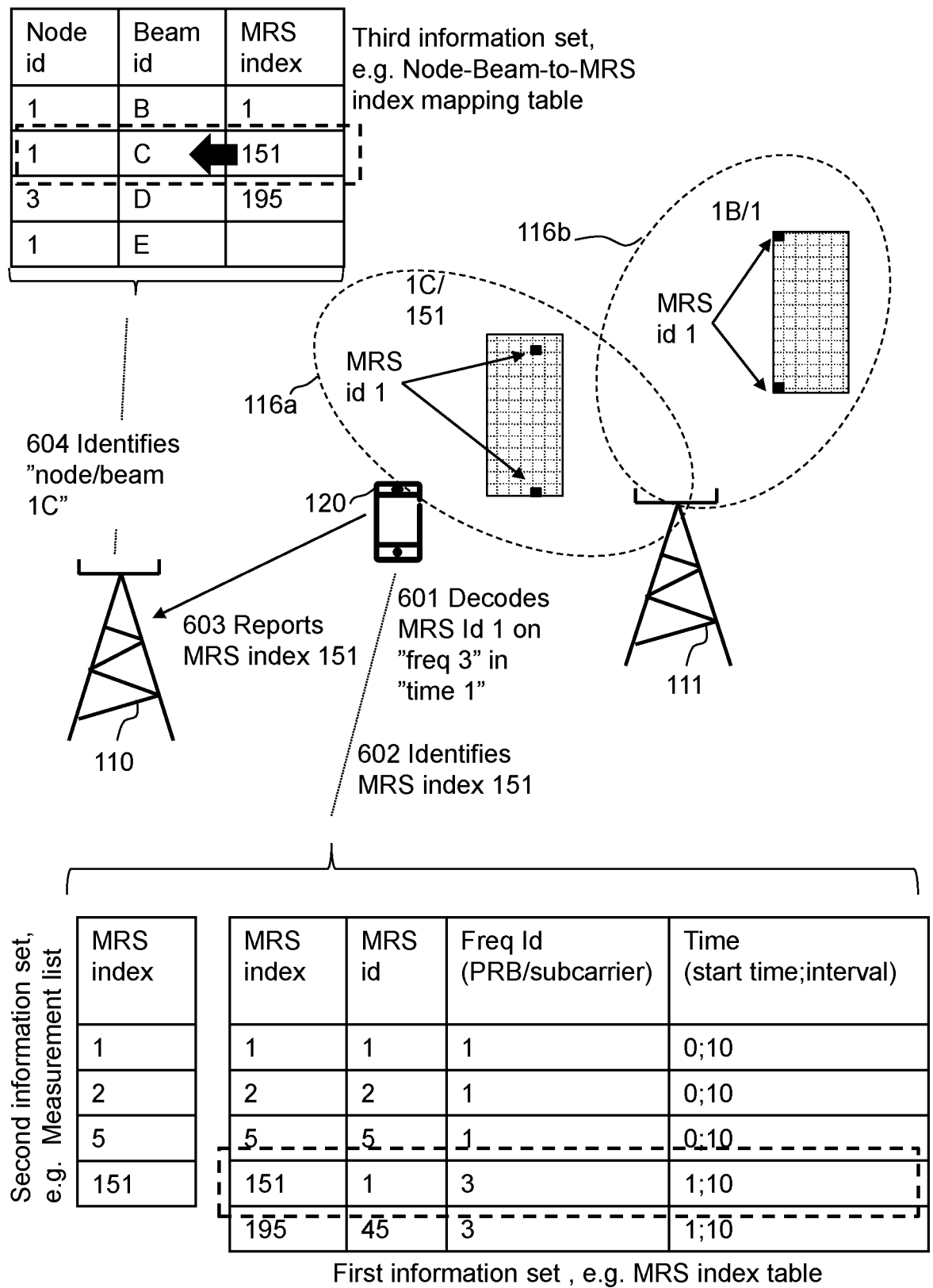
FIG. 6 schematically shows a further detailed example based on the scenario of FIG. 4.

FIG. 6 schematically shows a further detailed example based on the scenario of FIG. 4. The MRS index table is a bit more detailed than above, the frequency identifier is specified as a Physical Resource Block (PRB) per subcarrier, which identifies a frequency, and the time is a start time and a time interval, that may be referring to System Frame Number (SFN) as a reference timing. Timing is hence used to differentiate MRSs in a time domain. Time can be used for this purpose, but transmission points transmitting the MRSs should be synchronized. This means that a communication device, e.g. the communication device 120, can apply time synchronization from its source transmission point, e.g. beam 115a, and the first network node 110, also on MRSs transmitted from other transmission points.

As mentioned above, the communication device 120 searches for and attempts to identify, by performing measurements, reference signals, here the MRSs, according to the second information set, here the Measurement list. Hence, the communication device 120 attempts to find MRSs with index 1, 2, 5, 151, which according to the first information set, here the MRS index table, correspond to MRSs, each having a certain MRS id and being sent at a certain frequency and time. It has been attempted to, in the figure, schematically illustrate how the MRS of each beam, although having the same MRS id, still may differ in time and frequency.

In an action 601 the communication device 120 finds, e.g. decodes and identifies, MRS id 1 on frequency 3 at time 0. The communication device thus knows the MRS id, frequency and time for the successful finding. The communication device 120 then, in an action 602, uses this information and the first information set, i.e. here the MRS index table, to identify an associated MRS index, here MRS index 151. Then, in action 603, the communication device reports, i.e. sends the MRS index to the first network node 110, i.e. to its serving network node. The first network node 110 thereafter, in an action 604, uses the received MRS index 151 and the third information set, i.e. here the Node-Beam-to-MRS index mapping table, to find out which beam was sending the identified MRS, i.e. the MRS with MRS index 151. The table reveals that it was the beam identified by 1C, i.e. the beam 116a transmitted by the second network node 111.

The MRS index table described herein is thus an example of the predetermined first information set. The MRS indexes are examples of the predetermined identifiers. The MRS, i.e. a reference symbol for mobility purpose, and/or signature sequence(s), are examples of characteristics of reference signals. The MRS Id is an example of identifier identifying characteristics of a reference signal, here a reference symbol. As already indicated, the predetermined first information set may be predetermined and/or preconfigured for the wireless communication network 100 and may thus be known in advance by all relevant nodes and devices, such as radio network nodes, access nodes and communications devices.

Thanks to the predetermined first information set and the dynamic third information set, and the handling thereof as described above, it is e.g. enabled to:

Perform dynamic allocation of reference symbols to radio beams for mobility purpose, such as allocating a predetermined identifier, typically identifying said combination of a reference symbol and a frequency identifier and/or a time identifier, dynamically when needed and de-allocate when not needed. Such dynamic allocation resulting a smaller range of unique reference symbols needed, which improves performance in the network in many aspects. For example, battery lifetime in communication devices and link performance are improved, and also coverage when the reference symbols are broadcasted.

Use consistent data for beam switch mobility in all involved network nodes, including the communication device, while still allowing for dynamic allocation.

Minimize signaling effort between the communication device and the wireless communication network, and between network nodes, while still allowing for said dynamic allocation, since in principle only a predetermined identifier, e.g. MRS index, that can be kept comparatively small in size, is needed to be communicated.

Minimize complexity in communication devices since the communication device does not need to know about radio beam or network candidate network node identities, but is still able to, through the predetermined identifiers, report information about candidate radio beams and candidate radio network nodes in a consistent way.

As indicated elsewhere herein, the second information set enable further improvements regarding at least the last two points.

Figure 7:
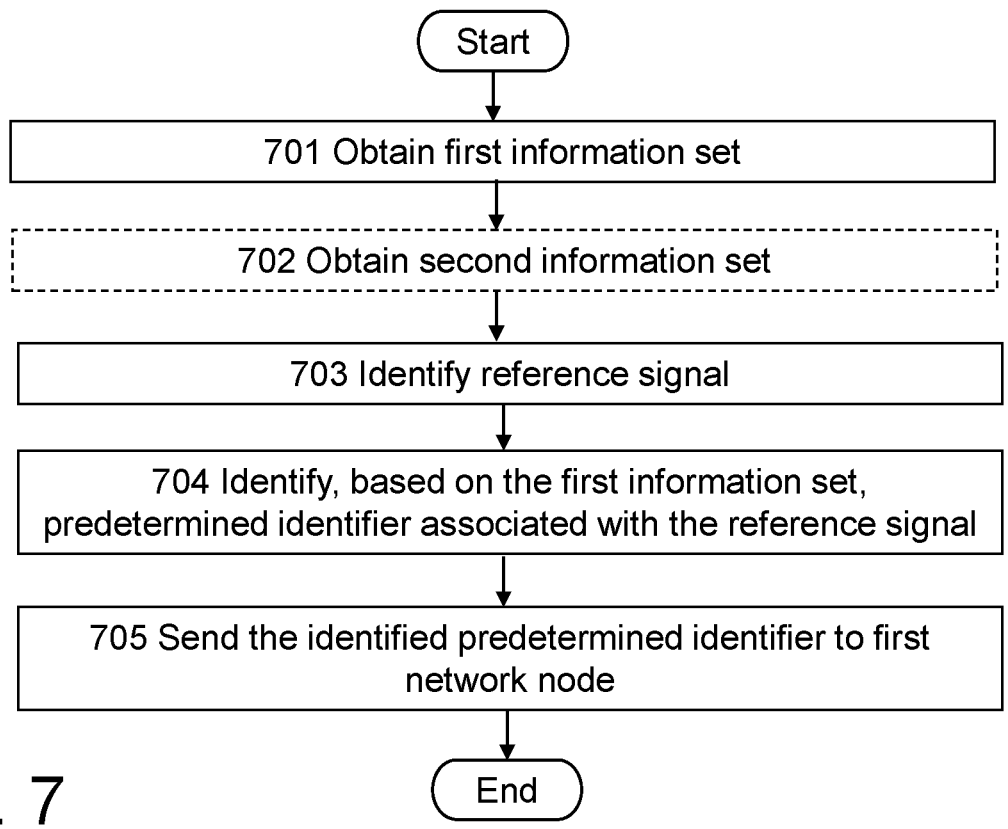
FIG. 7 is a flowchart schematically illustrating embodiments of a first method according to embodiments herein.

FIG. 7 is a flow chart schematically illustrating embodiments of a first method, performed by a communication device, e.g. the communication device 120, for supporting mobility of the communication device 120. The communication device 120 being served in a serving beam, e.g. the serving beam 115*a*, transmitted by a first network node, e.g. the first network node 110, comprised in a wireless communication network, e.g. the wireless communication network 100.

The first method comprises the following actions, which actions may be taken in any suitable order and/or be carried out fully or partly overlapping in time when this is possible and suitable.

Action 701

The communication device 120 obtains a first information set comprising predetermined identifiers identifying reference signals, respectively.

The predetermined identifiers in the first information set may identify frequency and/or time associated with transmission of the reference signals, and/or characteristics of the reference signals, whereby the reference signals can be found when transmitted and be identified by the predetermined identifiers.

Further, the predetermined identifiers may be in the form of indexes that, in the predetermined first information set, map to data that enables communication devices, including the communication device 120, to find and identify the reference signals.

This action may fully or partly correspond to action 302 as described above.

Action 702

The communication device 120 may obtain a second information set identifying reference signals to be searched for by communication devices, including the communication device 120.

The second information set may identify the reference signals based on a subset of predetermined identifiers of the first information set.

This action may fully or partly correspond to action 304 as described above.

Action 703

The communication device 120 identifies a reference signal being transmitted in a candidate beam, e.g. the beam 116*a*, other than the serving beam 115*a*, and provided by a candidate network node, e.g. the second network node 111.

When the second information set is obtained in Action 702, the reference signal is identified based on the second information set.

This action may fully or partly correspond to actions 312 and 601 as described above.

Action 704

The communication device 120 identifies, based on the first information set, a predetermined identifier associated with the reference signal.

This action may fully or partly correspond to actions 313 and 602 as described above.

Action 705

The communication device 120 sends the identified predetermined identifier to the first network node 110, thereby enabling the first network node 110 to identify the candidate beam 116*a* and/or the second network node 111 providing the candidate beam 116*a*.

This action may fully or partly correspond to actions 314 and 603 as described above.

Figure 8:
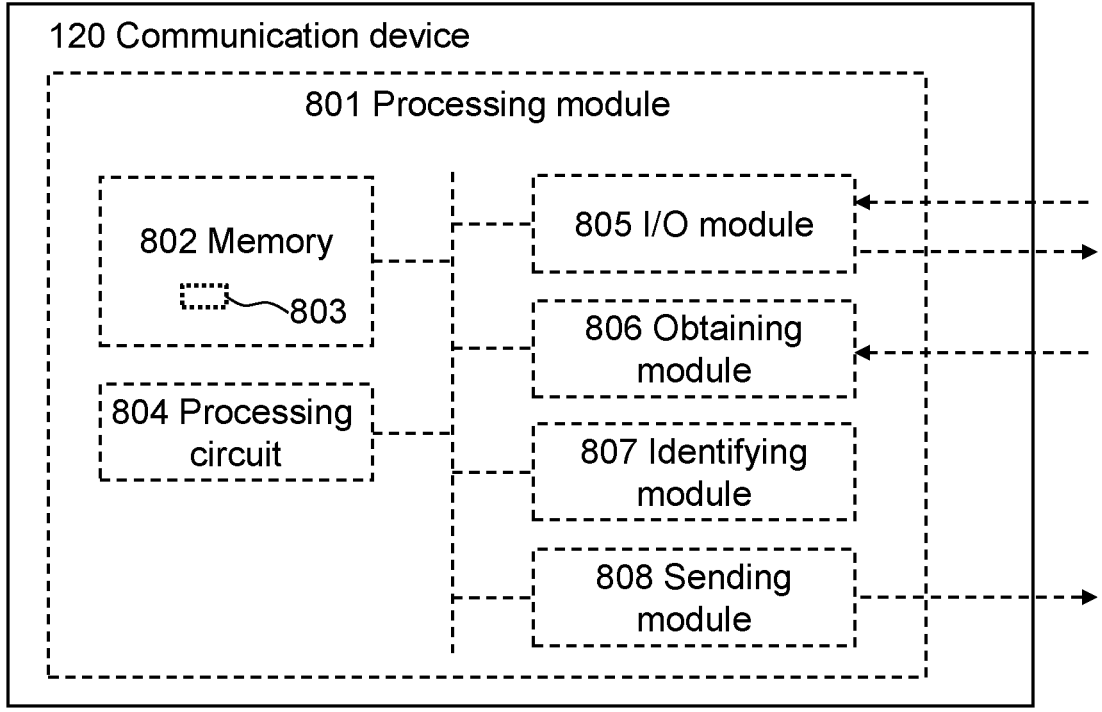
FIG. 8 is a functional block diagram for illustrating embodiments of an communication device according to embodiments herein and how it can be configured to carry out the first method.

FIG. 8 is a schematic block diagram for illustrating embodiments of how the communication device 120 may be configured to perform the first method and actions discussed above in connection with FIG. 7.

Hence, the communication device 120 is for supporting mobility of the communication device 120 when the communication device 120 is served in the serving beam 115*a* transmitted by the first network node 110 comprised in the wireless communication network 100.

The communication device 120 may comprise a processing module 801, such as a means, one or more hardware modules, including e.g. one or more processors, and/or one or more software modules for performing said methods and/or actions.

The communication device 120 may further comprise a memory 802 that may comprise, such as contain or store, a computer program 803. The computer program 803 comprises 'instructions' or 'code' directly or indirectly executable by the communication device 120 so that it performs said methods and/or actions. The memory 802 may comprise one or more memory units and may further be arranged to store data, such as configurations and/or applications involved in or for performing functions and actions of embodiments herein.

Moreover, the communication device 120 may comprise a processing circuit 804 as an exemplifying hardware module and may comprise or correspond to one or more processors. In some embodiments, the processing module 801 may comprise, e.g. is embodied in the form of or 'realized by' the processing circuit 804. In these embodiments, the memory 802 may comprise the computer program 803 executable by the processing circuit 804, whereby the communication device 120 is operative, or configured, to perform said first method and/or actions thereof.

Typically the communication device 120, e.g. the processing module 801, comprises an Input/Output (I/O) module 805, configured to be involved in, e.g. by performing, any communication to and/or from other units and/or nodes, such as sending and/or receiving information to and/or from other nodes or devices. The I/O module 805 may be exemplified by an obtaining, e.g. receiving, module and/or a providing, e.g. sending, module, when applicable.

Further, in some embodiments, the communication device 120, e.g. the processing module 801, comprises one or more of an obtaining module 806, an identifying module 807 and a sending module 808, as exemplifying hardware and/or software module(s). These modules may be fully or partly implemented by the processing circuit 804.

The communication device 120, and/or the processing module 801, and/or the processing circuit 804, and/or the I/O module 805, and/or the obtaining module 806 are operative, or configured, to obtain the first information set comprising predetermined identifiers identifying reference signals, respectively.

In some embodiments, the communication device 120, and/or the processing module 801, and/or the processing circuit 804, and/or the I/O module 805, and/or the obtaining module 806 are operative, or configured, to obtain the second information set identifying reference signals to be searched for by communication devices.

Moreover, the communication device 120, and/or the processing module 801, and/or the processing circuit 804, and/or the identifying module 807, are operative, or configured, to identify the reference signal being transmitted in the candidate beam 116*a* other than the serving beam 115*a* and provided by the second network node 111. In some embodiments, the identification is based on the second information set.

The communication device 120, and/or the processing module 801, and/or the processing circuit 804, and/or the identifying module 807, are also operative, or configured, to identify, based on the first information set, the predetermined identifier associated with the reference signal.

Further, the communication device 120, and/or the processing module 801, and/or the processing circuit 804, and/or the I/O module 805, and/or the sending module 808, are operative, or configured, to send the identified predetermined identifier to the first network node 110, thereby enabling the first network node 110 to identify the candidate beam 116a and/or the second network node 111 providing the candidate beam 116a.

Figure 9:
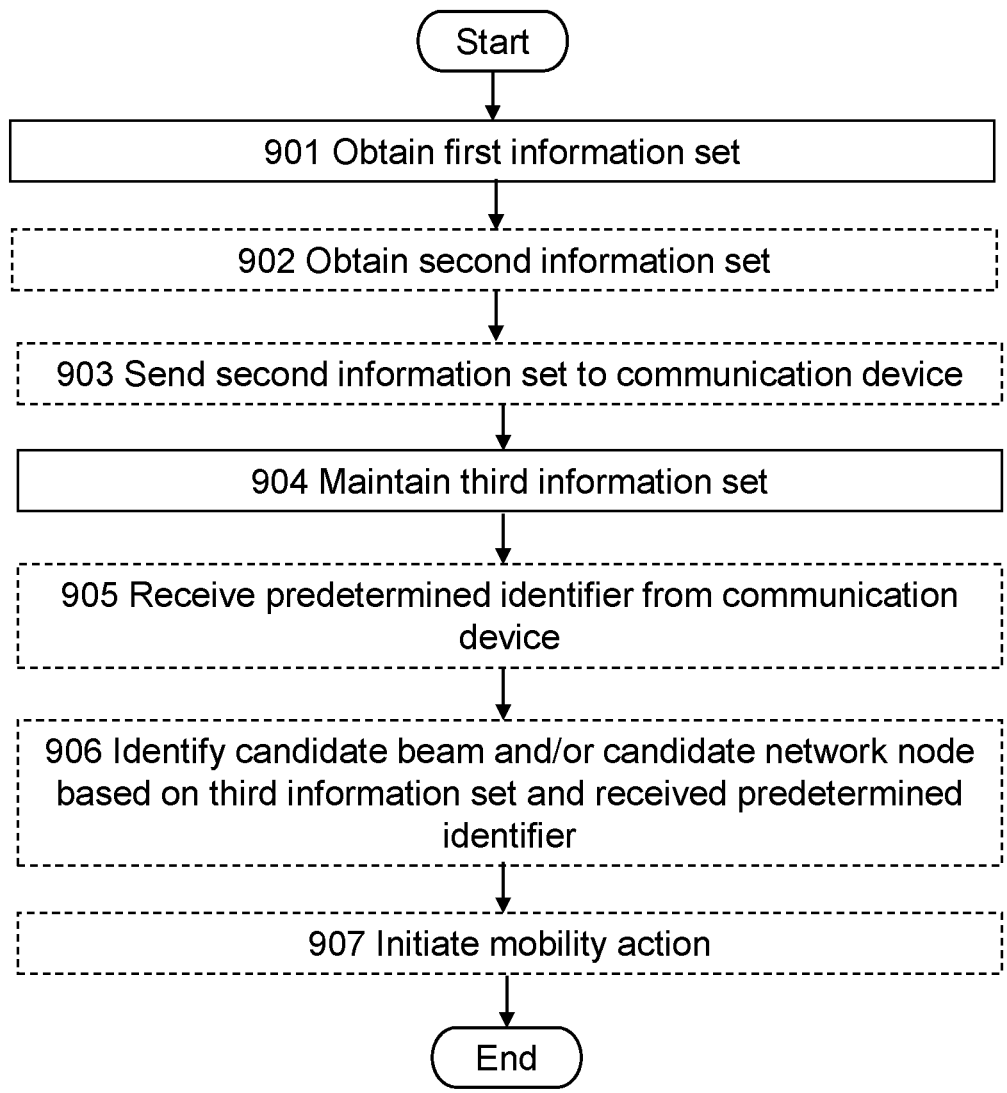
FIG. 9 is a flowchart schematically illustrating embodiments of a second method according to embodiments herein.

FIG. 9 is a flow chart schematically illustrating embodiments of a second method, performed by a first network node, e.g. the first network node 110, for supporting mobility of a communication device, e.g. the communication device 120, being served in a serving beam, e.g. the beam 115a, transmitted by the first network node 110. The first network node is comprised in a wireless communication network, e.g. the wireless communication network 100.

The second method comprises the following actions, which actions may be taken in any suitable order and/or be carried out fully or partly overlapping in time when this is possible and suitable.

Action 901

The first network node 110 obtains a first information set comprising predetermined identifiers identifying reference signals, respectively.

This action may fully or partly correspond to action 301a as described above.

Action 902

The first network node 110 may obtain a second information set identifying reference signals to be searched for by communication devices, e.g. the communication device 120.

The second information set may identify the reference signals by means of a subset of predetermined identifiers of the first information set.

This action may fully or partly correspond to action 304 as described above.

Action 903

The first network node 110 may send the obtained second information set to the communication device 120.

This action may fully or partly correspond to action 306 as described above.

Action 904

The first network node 110 maintains a third information set that associates one or more candidate beams, e.g. beams 115b, 116a-c, other than the serving beam 115a, with one or more predetermined identifiers of the first information set. Said one or more predetermined identifiers identify reference signals that are being transmitted in said one or more candidate beams.

The predetermined identifiers in the first information set may identify frequency and/or time associated with transmission of the reference signals, and/or characteristics of the reference signals, whereby the reference signals can be found when transmitted and be identified by the predetermined identifiers.

Further, the predetermined identifiers may be in the form of indexes that, in the first information set, map to data that enables communication devices, e.g. the communication device 120, to find and identify the reference signals.

In some embodiments, the maintenance of the third information set comprises updating the third information set based on information from one or more candidate network nodes, e.g. the first network node 110 and/or the second network node 111, regarding activation and/or deactivation of reference signals in one or more candidate beams, e.g. the beams 115b, 116a-c, other than the serving beam 115a, that are transmitted by said one or more candidate network nodes.

The associations of the third information set may associate a predetermined identifier with a beam identifier identifying a candidate beam, e.g. beam 116a, and with a network node identifier identifying a candidate network node, e.g. the second network node 111, providing the candidate beam 116a.

This action may fully or partly correspond to action 310 as described above.

Action 905

The first network node 110 may receive, from the communication device 120, a predetermined identifier associated with a reference signal that the communication device 120 has identified in a candidate beam, e.g. beam 116a, other than the serving beam 115a.

This action may fully or partly correspond to actions 314 and 603 as described above.

Action 906

The first network node 110 may identify, based on the third information set and the received predetermined identifier, the candidate beam 116a and/or the candidate network beam, here the second network node 111, providing the candidate beam 116a.

This action may fully or partly correspond to actions 315 and 604 as described above.

Action 907

The first network node 110 may initiate, based on the identified candidate beam 116a, and/or the identified candidate network node, here the second network node 111, a mobility action for transferring the communication device 120 from being served in the serving beam 115a by the serving first network node 110 to instead being served in the candidate beam 116a by the second network node 111.

Figure 10:
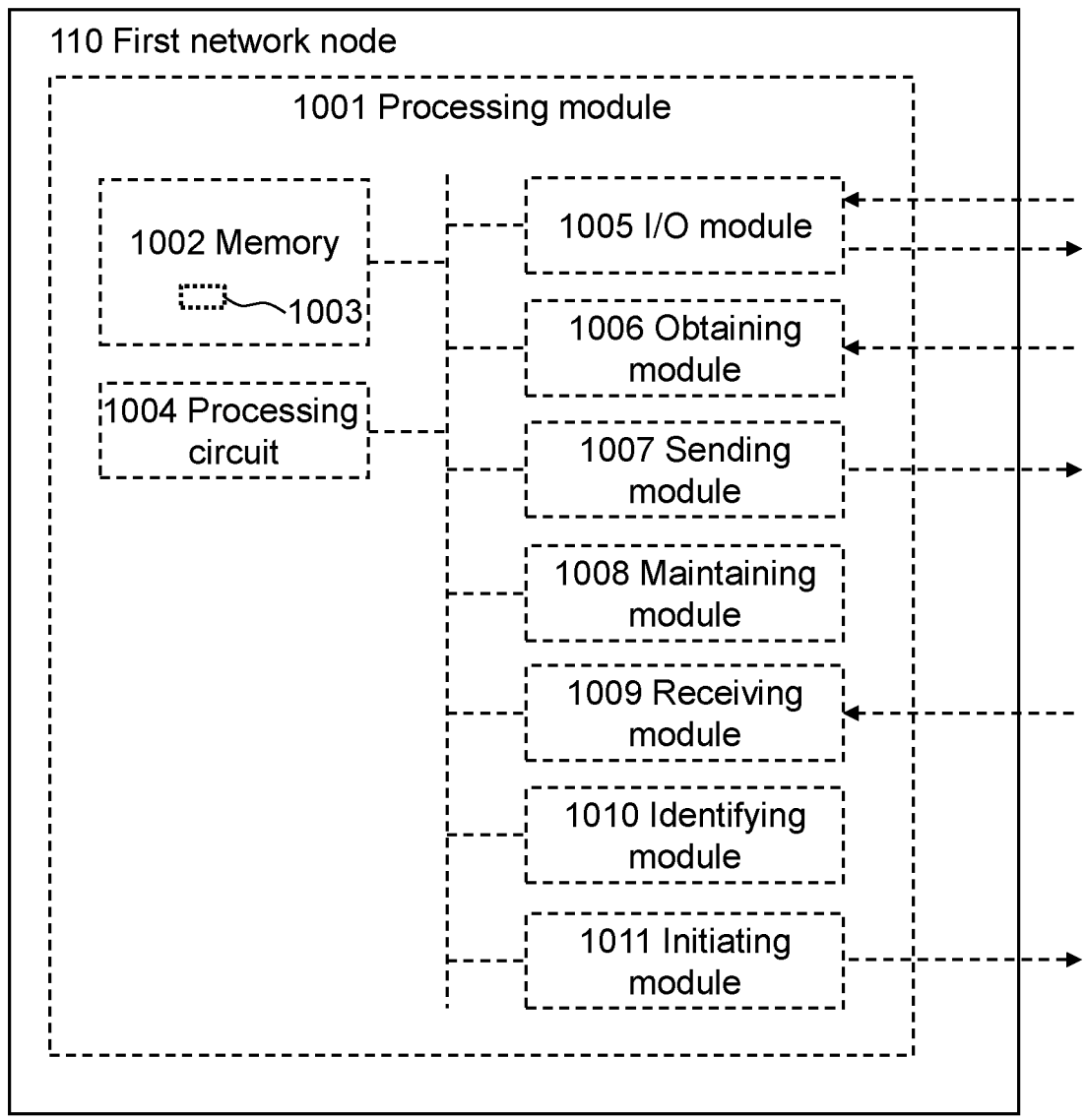
FIG. 10 is a functional block diagram for illustrating embodiments of first network node according to embodiments herein and how it can be configured to carry out the second method.

FIG. 10 is a schematic block diagram for illustrating embodiments of how the first network node 110 may be configured to perform the second method and actions discussed above in connection with FIG. 9.

Hence, the first network node 110 is for supporting mobility of the communication device 120 when the communication device 120 is served in the serving beam 115a transmitted by the first network node 110 when the first network node 110 is operative in the wireless communication network 100.

The first network node 110 may comprise a processing module 1001, such as a means, one or more hardware modules, including e.g. one or more processors, and/or one or more software modules for performing said methods and/or actions.

The first network node 110 may further comprise a memory 1002 that may comprise, such as contain or store, a computer program 1003. The computer program 1003 comprises 'instructions' or 'code' directly or indirectly executable by the first network node 110 so that it performs said methods and/or actions. The memory 1002 may comprise one or more memory units and may further be arranged to store data, such as configurations and/or applications involved in or for performing functions and actions of embodiments herein.

Moreover, the first network node 110 may comprise a processing circuit 1004 as an exemplifying hardware module and may comprise or correspond to one or more processors. In some embodiments, the processing module 1001 may comprise, e.g. 'is embodied in the form of or' 'realized by' the processing circuit 1004. In these embodiments, the memory 1002 may comprise the computer program 1003 executable by the processing circuit 1004, whereby the first network node 110 is operative, or configured, to perform said second method and/or actions thereof.

Typically the first network node 110, e.g. the processing module 1001, comprises an Input/Output (I/O) module 1005, configured to be involved in, e.g. by performing, any communication to and/or from other units and/or nodes, such as sending and/or receiving information to and/or from other nodes or devices. The I/O module 1005 may be exemplified by an obtaining, e.g. receiving, module and/or a providing, e.g. sending, module, when applicable.

Further, in some embodiments, the first network node 110, e.g. the processing module 1001, comprises one or more of an obtaining module 1006, a sending module 1007, a maintaining module 1008, a receiving module 1009, an identifying module 1010, and an initiating module 1011 as exemplifying hardware and/or software module(s). These modules may be fully or partly implemented by the processing circuit 1004.

The first network node 110, and/or the processing module 1001, and/or the processing circuit 1004, and/or the I/O module 1005, and/or the obtaining module 1006 are operative, or configured, to obtain the first information set comprising predetermined identifiers identifying reference signals, respectively.

In some embodiment, the first network node 110, and/or the processing module 1001, and/or the processing circuit 1004, and/or the I/O module 1005, and/or the obtaining module 1006 are further operative, or configured, to obtain the second information set identifying reference signals to be searched for by communication devices, e.g. the communication device 120.

In some embodiments, the first network node 110, and/or the processing module 1001, and/or the processing circuit 1004, and/or the I/O module 1005, and/or the sending module 1007 are operative, or configured, to send the obtained second information set to the communication device 120.

The first network node 110, and/or the processing module 1001, and/or the processing circuit 1004, and/or the I/O module 1005, and/or the maintaining module 1008 are operative, or configured, to maintain the third information set that associates one or more candidate, beams, e.g. beams 115b, 116a-c, other than the serving beam 115a, with one or more predetermined identifiers of the first information set. The one or more predetermined identifiers identifying reference signals that are being transmitted in said one or more candidate beams.

In some embodiments, the first network node 110, and/or the processing module 1001, and/or the processing circuit 1004, and/or the I/O module 1005, and/or the receiving module 1009 are operative, or configured, to receive, from the communication device 120, the predetermined identifier associated with the reference signal that the communication device 120 has identified in the candidate beam 116a other than the serving beam 115a.

In some embodiments, the first network node 110, and/or the processing module 1001, and/or the processing circuit 1004, and/or the identifying module 1010 are operative, or configured, to identify, based on the third information set and the received predetermined identifier, the candidate beam 116a and/or the candidate network node 111 providing the candidate beam 116a.

In some embodiments, the first network node 110, and/or the processing module 1001, and/or the processing circuit 1004, and/or the I/O module 1005, and/or the initiating module 1010 are operative, or configured, to initiate, based on the identified candidate beam 116a and/or the identified candidate second network node 111, the mobility action for transferring the communication device 120 from being served in the serving beam 115a by the serving first network node 110 to instead being served in the candidate beam 116a by the candidate second network node 111.

Figure 11A:
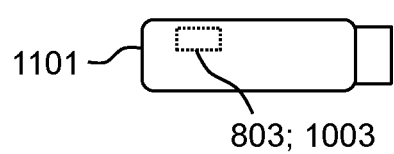
FIGS. 11a-c are schematic drawings illustrating embodiments relating to computer program products and computer programs to cause the communication device and/or the first network node to perform the first method and/or second method, respectively.
Figure 11B:
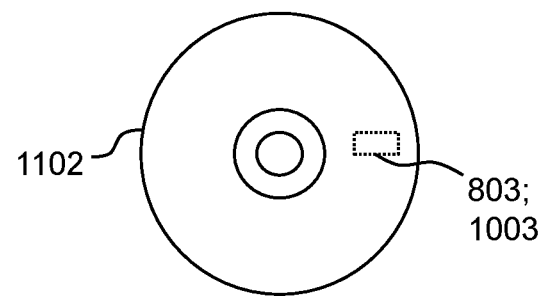
Figure 11C:
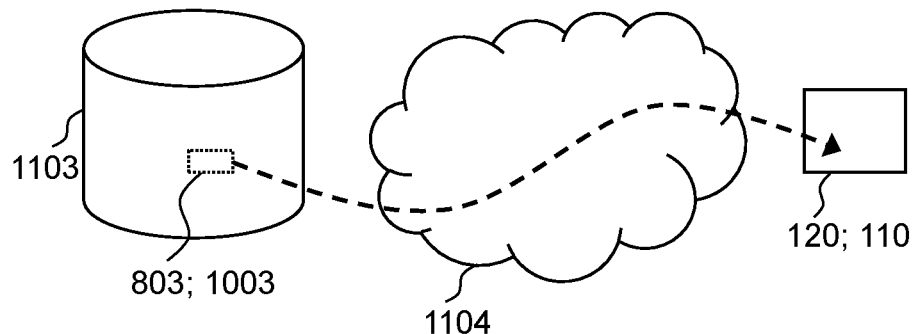

FIGS. 11a-c are schematic drawings illustrating embodiments relating to a computer program that may be any one of the computer programs 803, 1003 and that comprises instructions that when executed by the processing circuits 804, 1004, respectively, and/or the processing modules 801, 1001, respectively, causes the communication device 120, and/or the first network node 110, to perform as described above.

In some embodiments there is provided a carrier, such as a data carrier, e.g. a computer program product, comprising any one or more of the computer programs 803, 1003. The carrier may be one of an electronic signal, an optical signal, a radio signal, and a computer readable medium. Any one, some or all of the computer programs 803, 1003 may thus be stored on the computer readable medium. By carrier may be excluded a transitory, propagating signal and the carrier may correspondingly be named non-transitory carrier. Non-limiting examples of the carrier being a computer-readable medium is a memory card or a memory stick 1101 as in FIG. 11a, a disc storage medium 1102 such as a CD or DVD as in FIG. 11b, a mass storage device 1103 as in FIG. 11c. The mass storage device 1103 is typically based on hard drive(s) or Solid State Drive(s) (SSD). The mass storage device 1103 may be such that is used for storing data accessible over a computer network 1104, e.g. the Internet or a Local Area Network (LAN).

Any one, some or all of the computer programs 803, 1003 may furthermore be provided as a pure computer program or comprised in a file or files. The file or files may be stored on the computer-readable medium and e.g. available through download e.g. over the computer network 1104, such as from the mass storage device 1103 via a server. The server may e.g. be a web or File Transfer Protocol (FTP) server. The file or files may e.g. be executable files for direct or indirect download to and execution on the communication device 120, and/or the first network node 110, to perform as described above, e.g. by any one, some or all of the processing circuits 804, 1004. The file or files may also or alternatively be for intermediate download and compilation involving the same or another processor to make them executable before further download and execution causing the communication device 120, and/or the first network node 110, to perform as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the communication device 120 and/or first network node 110 to be configured to and/or to perform the above-described actions of the first method and second method, respectively.

Identification, e.g. by any identifier, herein may be implicit or explicit. The identification may be unique in the wireless communication network 100 or at least in a meaningful and relevant part or area thereof, as realized by the skilled person.

As used herein, each of the term "node", or "network node", "device", "arrangement" may refer to one or more physical entities, such as devices, apparatuses, computers, servers or the like. This may mean that any embodiment herein may be implemented in a single physical entity or alternatively, may be implemented in a plurality of physical entities, such as a system or arrangement comprising said one or more physical entities, i.e. some embodiments herein may be implemented in a distributed manner, such as on a set of interconnected devices, e.g. server machines of a cloud system, also known as e.g. computer cloud.

Note that in case it is possible and/or suitable, one or more embodiments herein, e.g. relating to one or more methods and/or entities, can be implemented in one and the same physical arrangement or entity.

As used herein, the term "unit" may refer to one or more functional units, each of which may be implemented as one or more hardware modules and/or one or more software modules in a node.

As an example, the expression "means" may be a module corresponding to the modules listed above in conjunction with the figures.

The term "network node" as used herein may as such in principle refer to any type of radio network node (described below) or any network node, which may communicate with at least a radio network node. Examples of such network nodes include any radio network node stated above, a core network node, an Operations & Maintenance (O&M) node, an Operations Support Systems (OSS) node, an Operation, Administration and Maintenance (OAM) node, a Self Organizing Network (SON) node, a positioning node etc. The term "radio network node" as used herein may as such refer to a network node comprised in a RAN, and is typically of a certain RAT, or any type of network node serving a wireless device, e.g. UE, and/or that are connected to and operating with other network node(s) or network element(s) or any radio node in order to send and/or receive radio signals to/from a communication device. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" as used herein, may as such refer to any type of communication device arranged to communicate with a radio network node in a wireless, communication network, such as the wireless communication network 100. Examples may include so called: device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc, just to mention some examples. While said terms are used frequently herein for convenience, or in the context of examples involving other 3GPP nomenclature, it must be appreciated that the term as such is non-limiting and the teachings herein apply to essentially any type of communication device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first method, second method, and first arrangement, second arrangement, etc., and the like, as may be used herein, as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method of operation by a communication device configured for operation in a wireless communication network, wherein the method comprises:
   detecting a Mobility Reference Signal (MRS) conveyed in a non-serving radio beam having a neighboring relationship with a serving radio beam used by a serving radio network node of the wireless communication network for serving the communication device;
   mapping the detected MRS to an index value, according to mapping information that maps individual ones in a set of index values to respective MRSs in a corresponding set of MRSs representing a set of non-serving radio beams having a neighboring relationship with the serving radio beam;

generating a measurement report for reporting the detected MRS to the serving radio network node, the measurement report using the mapped index value to identify the detected MRS; and sending the measurement report to the serving radio network node, thereby enabling the serving radio network node to identify the non-serving radio beam that conveyed the detected MRS, based on further mapping information that maps individual ones in the set of index values to respective non-serving radio beams in a set of non-serving radio beams that are possible candidates for serving the communication device.

2. The method as claimed in claim 1, wherein detecting the MRS conveyed in the non-serving radio beam includes searching for the MRS on time or frequency resources indicated in the mapping information.

3. The method as claimed in claim 1, wherein the method further comprises receiving further information that indicates a subset of MRSs in the corresponding set of MRSs, and wherein detecting the MRS conveyed in the non-serving radio beam comprises detecting the MRS as one of the one or more MRSs included in the subset of MRSs.

4. A method performed by a first network node in a wireless communication network, wherein the method comprises:

receiving a measurement report from a communication device being served by a serving radio network node of the wireless communication network, the measurement report indicating an index value corresponding to a Mobility Reference Signal (MRS) detected by the communication device, the MRS conveyed in a non-serving radio beam having a neighboring relationship with a serving radio beam used by the serving radio network node for serving the communication device;

identifying the non-serving radio beam that conveyed the MRS detected by the communication device, based on mapping information that maps individual ones in a set of index values to respective non-serving radio beams in a set of non-serving radio beams that are possible candidates for serving the communication device; and initiating a mobility action for the communication device, where the identified non-serving radio beam is evaluated as a candidate for use as a new serving beam for serving the communication device.

5. The method as claimed in claim 4, further comprising initiating a non-persistent transmission of the MRS via the non-serving radio beam, based on communicating with a radio network node responsible for transmitting the non-serving radio beam, the initiating being done to support the mobility action.

6. The method as claimed in claim 4, further comprising providing further mapping information to the communication device, the further mapping information mapping individual ones in the set of index values to corresponding ones in a set of MRSs, thereby enabling the communication device to use the corresponding index value to identify to the network node any given MRS in the set of MRSs that is detected by the communication device.

7. The method as claimed in claim 4, further comprising receiving information regarding at least one of activation and deactivation of MRSs used in the set of non-serving radio beams that are possible candidates for serving the communication device.

8. The method as claimed in claim 4, wherein the mapping information maps each index value to a node identifier and a beam identifier.

9. The method as claimed in claim 4, wherein the method further comprises determining a measurement list for the communication device, the measurement list comprising a subset of index values in a set of index values corresponding to the set of non-serving radio beams that are possible candidates for serving the communication device, and sending the measurement list to the communication device, thereby identifying which MRSs the communication device should attempt to detect.

10. The method as claimed in claim 4, wherein the network node is the serving radio network node.

11. A communication device configured for operating in a wireless communication network, wherein the communication device comprises:

communication circuitry configured for communicating with radio network nodes of the wireless communication network; and processing circuitry operatively associated with the communication circuitry and configured to:

detect a Mobility Reference Signal (MRS) conveyed in a non-serving radio beam having a neighboring relationship with a serving radio beam used by a serving radio network node of the wireless communication network for serving the communication device;

map the detected MRS to an index value, according to mapping information that maps individual ones in a set of index values to respective MRSs in corresponding set of MRSs representing a set of non-serving radio beams having a neighboring relationship with the serving radio beam;

generate a measurement report for reporting the detected MRS to the serving radio network node, the measurement report using the mapped index value to identify the detected MRS; and send the measurement report to the serving radio network node, thereby enabling the serving radio network node to identify the non-serving radio beam that conveyed the detected MRS, based on further mapping information that maps individual ones in the set of index values to respective non-serving radio beams in a set of non-serving radio beams that are possible candidates for serving the communication device.

12. The communication device as claimed in claim 11, wherein the processing circuitry is configured to detect the MRS conveyed in the non-serving radio beam, based on searching for the MRS on time or frequency resources indicated in the mapping information.

13. The communication device as claimed in claim 11, wherein the processing circuitry is configured to receive further information that indicates a subset of MRSs in the corresponding set of MRSs to be detected, and detect the MRS conveyed in the non-serving radio beam as one of the one or more MRSs included in the subset of MRSs.

14. A first network node configured for operation in a wireless communication network, wherein the network node comprises:

communication circuitry configured for communicating directly or indirectly with a communication device operating in the wireless communication network; and processing circuitry operatively associated with the communication circuitry and configured to:

receive a measurement report from the communication device, the measurement report indicating an index value corresponding to a Mobility Reference Signal (MRS) detected by the communication device, the MRS conveyed in a non-serving radio beam having a neighboring relationship with a serving radio beam used by a serving radio network node for serving the communication device, the serving radio network node being the network node or being communicatively coupled to the network node;

identify the non-serving radio beam that conveyed the MRS detected by the communication device, based on mapping information that maps individual ones in a set of index values to respective non-serving radio beams in a set of non-serving radio beams that are possible candidates for serving the communication device; and initiate a mobility action for the communication device, where the identified non-serving radio beam is evaluated as a candidate for use as a new serving beam for serving the communication device.

15. The first network node as claimed in claim 14, wherein the processing circuitry is further configured to initiate a non-persistent transmission of the MRS via the non-serving radio beam, based on communication with a radio network node responsible for transmitting the non-serving radio beam, the initiating being done to support the mobility action.

16. The first network node as claimed in claim 14, wherein the processing circuitry is further configured to provide further mapping information to the communication device, the further mapping information mapping individual ones in the set of index values to corresponding ones in a set of MRSs, thereby enabling the communication device to use the corresponding index value to identify to the network node any given MRS in the set of MRSs that is detected by the communication device.

17. The network node as claimed in claim 16, wherein the processing circuitry is configured to determine a measurement list for the communication device, the measurement list comprising a subset of index values in a set of index values corresponding to the set of non-serving radio beams that are possible candidates for serving the communication device, and send the measurement list to the communication device, thereby identifying which MRSs the communication device should attempt to detect.

18. The network node as claimed in claim 17, wherein the network node is the serving radio network.

19. The network node as claimed in claim 14, wherein the processing circuitry is further configured to receive information regarding at least one of activation and deactivation of MRSs used in the set of non-serving radio beams that are possible candidates for serving the communication device.

20. The first network node as claimed in claim 14, wherein the mapping information maps each index value to a node identifier and a beam identifier.

* * * * *